United States Patent
Gu et al.

(10) Patent No.: US 10,751,956 B2
(45) Date of Patent: Aug. 25, 2020

(54) METHOD FOR MANUFACTURING FIBER-REINFORCED PLASTIC PRODUCTS

(71) Applicant: Covestro Deutschland AG, Leverkusen (DE)

(72) Inventors: Yongming Gu, Shanghai (CN); Yuan Cheng, Shanghai (CN); Yichen Zheng, Shanghai (CN); Guobin Sun, Shanghai (CN); Shuangyin Xiao, Tianjin (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 134 days.

(21) Appl. No.: 15/565,627

(22) PCT Filed: Apr. 6, 2016

(86) PCT No.: PCT/EP2016/057465
§ 371 (c)(1),
(2) Date: Oct. 10, 2017

(87) PCT Pub. No.: WO2016/162348
PCT Pub. Date: Oct. 13, 2016

(65) Prior Publication Data
US 2018/0072005 A1    Mar. 15, 2018

(30) Foreign Application Priority Data
Apr. 10, 2015   (CN) .......................... 2015 1 0187087

(51) Int. Cl.
*B29C 70/44*   (2006.01)
*B29C 70/54*   (2006.01)
(Continued)

(52) U.S. Cl.
CPC .......... *B29C 70/443* (2013.01); *B29C 70/546* (2013.01); *B29K 2063/00* (2013.01); *B29K 2075/00* (2013.01)

(58) Field of Classification Search
CPC . B29C 2043/3433; B29C 70/02; B29C 43/34; B29C 70/443; B29C 70/548
See application file for complete search history.

(56) References Cited

U.S. PATENT DOCUMENTS

| | | | | |
|---|---|---|---|---|
| 5,052,906 A | * | 10/1991 | Seemann | B29C 43/203 264/258 |
| 2002/0020934 A1 | * | 2/2002 | Hinz | B29C 70/443 264/40.6 |
| 2013/0175740 A1 | * | 7/2013 | Shinoda | B29C 43/3642 264/571 |

FOREIGN PATENT DOCUMENTS

| | | | | |
|---|---|---|---|---|
| CN | 104325658 A | | 2/2015 | |
| CN | 104325658 B | * | 2/2015 | ............. B29C 70/34 |

(Continued)

OTHER PUBLICATIONS

English Translation of CN104325658B electronically translated by Google. (Year: 2015).*

(Continued)

Primary Examiner — Anthony Calandra
Assistant Examiner — Elisa Vera
(74) Attorney, Agent, or Firm — K&L Gates LLP

(57) ABSTRACT

The present application relates to a method for manufacturing fiber-reinforced plastic products. This method comprises: preparing a fiber preform on a mold; disposing first and second flow meshes and first and second demolding cloths; sealing the fiber preform to form a vacuum system by pumping; penetrating the resin through the first peel ply via the first flow mesh and impregnates the fiber preform from bottom to top; penetrating the resin through the second peel ply via the second flow mesh and impregnates the fiber preform from top to bottom; and attaining a resin-impregnated fiber perform and finally attaining fiber-reinforced plastic products.

23 Claims, 4 Drawing Sheets

(51) Int. Cl.
    *B29K 63/00*      (2006.01)
    *B29K 75/00*      (2006.01)

(56)           References Cited

FOREIGN PATENT DOCUMENTS

| | | | | |
|---|---|---|---|---|
| DE | 19922850 C1 | * | 8/2000 | ............ B29C 70/48 |
| EP | 1555104 A1 | | 7/2005 | |
| JP | 2011104862 A | | 6/2011 | |

OTHER PUBLICATIONS

International Search Report and Written Opinion for International Application No. PCT/EP2016/057465, European Patent Office, dated Jun. 7, 2016.

* cited by examiner

METHOD FOR MANUFACTURING FIBER-REINFORCED PLASTIC PRODUCTS

CROSS-REFERENCE TO RELATED APPLICATIONS

This application is a U.S. national stage application, filed under 35 U.S.C. § 371, of International Application No. PCT/EP2016/057465, which was filed on Apr. 6, 2016, and which claims priority to Chinese Patent Application No. 201510187087.2, which was filed on Apr. 10, 2015, the contents of each are incorporated by reference into this specification.

FIELD OF INVENTION

The present invention relates to a method for manufacturing fiber-reinforced plastic products. Specifically, the present invention particularly relates to a method for molding fiber-reinforced plastic products with greater thicknesses by using a vacuum infusion process. The method is particularly suitable for the vacuum infusion molding of fiber-reinforced resin composite products such as polyurethane resin, epoxy resin and unsaturated resin, etc.

BACKGROUND OF INVENTION

The vacuum infusion process has been widely used in the molding process of fiber-reinforced resin composite products. Generally speaking, the process is: first, disposing a certain number of layers of fibers on the mold in accordance with the design requirements to form a fiber preform, wherein the fiber preform may contain core materials such as foam, balsa or other reinforcing materials; in addition, there are also process materials such as a peel ply or release film, flow mesh, resin runner, injection port, resin tube, vacuum tube, suction port etc. disposed on the fiber preform; then, sealing the aforesaid fiber preform and process materials by using a vacuum bag and a sealant tape to form a completely sealing system; connecting the suction port with a vacuum pump to draw out the air within the aforesaid sealing system, and thus to reach a vacuum pressure of $-0.05$ MPa to $-0.1$ MPa; then, inserting the resin tube into an opened vessel filled with resin; the resin is vacuum sucked into the aforesaid sealing system via the resin tube under the action of atmospheric pressure, and impregnates the fiber preform quickly in the aid of the resin runner resin runner and the flow mesh; then, according to the characteristics of the resin that is used, curing the resin at room temperature or by heating the mold; removing the aforesaid process materials and taking the cured product out from the mold to obtain the final product.

The key of the above process is: to reasonably establish the resin flow-guiding system, namely the positions and sizes of the process materials such as the injection port, the resin runner, the flow mesh, the vacuum tube, the suction port etc., so that the air within the aforesaid fiber preform can be discharged smoothly during the infusion process, and that the resin can completely impregnate the entire fiber preform before it gels, thus avoiding the occurrence of dry fiberglass, white spots and other defects.

With the expansion of the application arts of composite materials, the application of composite materials in yachts, fishing boats, aviation and wind power and other fields becomes wider and wider, and the sizes of the products are also growing. The increase of the product size, particularly the increase of the thickness, will make it much more difficult to discharge the air from the sealing system, and extend the flow time of the resin inside the fiber preform. Restrained by the viscosity and gel time of the resin, vacuum infusion of products with greater thicknesses becomes more difficult.

In the prior art, there are some solutions provided for trying to solve the aforesaid technical problem.

For example, Chinese patent application CN101708658A discloses a method for manufacturing a spar cap of a wind turbine blade, wherein a flow mesh is disposed below a fiber preform to assist the flow of the resin, and a semi-permeable membrane, which is permeable to air but is non-permeable to the resin, is disposed above the fiber preform for air-pumping. By using said manufacturing method, the resin impregnates the fiber preform from the bottom of the fiber preform to the top. The semi-permeable membrane disposed above the fiber preform can continuously discharge the air within the fiber preform to avoid that a part of the air was surrounded by resin due to the uneven flow of the resin, and thus results in white spots or dry glass fibers and other defects. This manufacturing method is generally adopted in the present technical field.

However, this method also has the following restrictions: since the resin needs to impregnate the entire fiber preform from bottom to top, the resin needs to flow through the entire thickness of the fiber preform. Limited by resin viscosity and gel time, when the resin cannot completely impregnate the entire thickness of the fiber preform within its gel time, the application of this method will be restricted.

In another example, Chinese patent application CN103817955A discloses an infusion method for a carbon fiber spar cap of a wind turbine blade, wherein flow meshes are disposed both below and above a fiber preform to assist the flow of a resin. Compared to a glass fiber, the filament diameter of a carbon fiber is smaller, and the distance between the filaments is also smaller. Thus, it will be much more difficult to make the resin flow between the carbon fibers and impregnate the resin. Therefore, the carbon fiber preform is generally harder to be infused than the glass fiber preform.

A significant drawback of this method is: from the beginning of the infusion, the resin flows to the middle of the fiber preform from both the top and the bottom simultaneously. During the entire process of infusion, the air in the most middle part of the fiber preform can hardly be discharged effectively. Such results are: the middle part of the fiber preform is not sufficiently impregnated, and thus forms white spots or dry glass fibers.

International PCT patent application WO2004/033176 discloses another infusion method for a carbon fiber preform, wherein flow meshes are disposed both below and above a fiber preform to assist the flow of a resin. By using said method, first, the resin is injected from the flow mesh below the fiber preform; thus, the resin will impregnate the fibers from the bottom of the fiber preform to top, making the air within the fiber preform discharged via the above flow mesh and suction port. Until the resin impregnates about two-thirds of the thickness of the fiber preform, the resins is injected from the flow mesh above the fiber preform, and thus enable the resin to impregnate the remaining fibers from the top of the fiber preform to bottom.

This method avoids the problem that the fibers in the middle of the fiber preform cannot be sufficiently impregnated caused by the injection of the resin from both the top and the bottom of the fiber preform simultaneously, but also brings some new technical problems: first, the injection port and the suction port arranged above the fiber preform will tightly press against the fiber preform under the action of atmospheric pressure to form imprints, making the fibers bend and affecting the mechanical properties and the surface quality of the products; second, in said method, both of the injection port and the suction port above the fiber preform are connected with the flow mesh above the fiber preform to strengthen the speeding of discharging the air within the fiber preform at the beginning stage of resin injection. Practices prove that by using said method, the resin injected though the injection port above the fiber preform will flow into the suction port through the flow mesh very quickly, resulting in the interruption of the vacuum pumping. At the moment, the air within the fiber preform can no longer be discharged, producing dry glass fibers or white spots or other defects below the flow mesh.

In another example, Chinese patent application CN104325658A discloses a method for manufacturing a spar cap of a wind turbine blade, wherein flow meshes are placed both below and above a fiber preform to assist the flow of a resin. By using said method, first, the resin is injected from the flow mesh below the fiber preform; the resin impregnates the fibers from the bottom of the fiber preform to top. When the part of the fiber preform near the injection port is completely impregnated with the resin and the resin flows to the flow mesh above the fiber preform, start injecting the resin from the above flow mesh. Thus, the resin impregnates the fibers from the top of the fiber preform to bottom and finally realize the complete infusion.

A significant drawback of this method is: the injection tube placed above the fiber preform needs to suspend above the fiber preform to avoid the formation of imprints caused by the direct contact of injection tube and injection port with the fiber preform, and ultimately affecting the mechanical properties and surface quality of the products. Practices prove that it is very difficult to carry out said method during the manufacturing process, and thus it can hardly be used in practical production. In addition, said method uses the way of placing a single layer of discharge passage on the side of the top of the fiber preform which is far away from the injection port. Because of the irregularity of the flow of the resin, said discharge passage can easily be blocked by the resin penetrating from the bottom of the fiber preform, causing the air near said passage impossible to be discharged continuously. Meanwhile, since the position of said discharge passage is farthest away from the injection port of the resin, i.e., the last part to be impregnated in the entire fiber preform, the result of the discharge passage being blocked by the resin is that the glass fibers near the position of said discharge passage can easily form dry glass fibers or white spots because the air cannot be sufficiently discharged.

Based on the aforesaid prior art, when infusing a fiber (e.g., carbon fiber) preform which has a relatively large thickness or can hardly be impregnate by the resin, it is urgently required to develop a method for manufacturing fiber-reinforced plastic/resin products which not only can realize the complete and sufficient impregnation of the fiber preform and avoid the production of the defects like dry glass fibers and/or white spots, but also is conducive to the implementation during the manufacturing process.

SUMMARY OF THE INVENTION

The purpose of the present invention is to provide a method for manufacturing fiber-reinforced plastic products, which can not only realize the complete and sufficient impregnation of fiber preforms that have greater thicknesses or can hardly be completely impregnated by the resin, while avoiding dry glass fibers and/or white spots and other defects, but also is conducive to the implementation during the manufacturing process.

The present invention aims to provide a method for manufacturing fiber-reinforced plastic products, comprising the following steps of:
preparing a fiber preform on a mold and disposing a first peel ply and a first flow mesh between the mold and the fiber preform;
disposing a second peel ply and a second flow mesh on the fiber preform;
disposing a first injection port and a second injection port for supplying a resin on the first flow mesh and the second flow mesh, respectively;
sealing the fiber preform to form a sealing system, and pumping the air within the sealing system via a suction port until the sealing system becomes a vacuum system;
supplying the resin to the first flow mesh via the first injection port so that the resin penetrates through the first peel ply and impregnates the fiber preform from bottom to top;
supplying said resin to the second flow mesh via the second injection port so that the resin penetrates through the second peel ply and impregnates the fiber preform from top to bottom; and
attaining a resin-impregnated fiber preform and finally attaining the fiber-reinforced plastic products,
characterized in that
a first film is disposed on a resin-injection side of the fiber preform to cover said first injection port, the first demolding cloth, the first flow mesh and at least a part of the fiber preform, after the resin is supplied to the first flow mesh via the first injection port, the resin is supplied to the second flow mesh via the second injection port when the resin over the fiber preform flows beyond the area covered by the first film.

Preferably, a first covering width a of said fiber preform 2 covered with said first film 5a is 0.5 to 10 times of a thickness of said fiber preform 2, more preferably 0.5 to 2 times, the most preferably 1 to 2 times.

On the other hand, a semi-permeable membrane, which is permeable to air but is non-permeable to the resin, is disposed within a region without the second flow mesh on an air-pumping side of the fiber preform. The suction port is disposed above said semi-permeable membrane. A breathable material is disposed between the semi-permeable membrane and the suction port.

A stopper can be disposed on the air-pumping side of the fiber preform so that said second peel ply and the semi-permeable membrane disposed at an edge of the fiber preform extend onto the stopper.

Alternatively, a stopper can be disposed on the air-pumping side of the fiber preform so that the second peel ply disposed at an edge of the fiber preform extends onto the stopper and the mold to constitute a peel ply extension segment, and the suction port is disposed on the peel ply extension segment; a second film at least partly covers the peel ply extension segment and the suction port and partly covers the fiber preform.

Preferably, a width of said fiber perform covered with said second film 5b is 10% to 70%, more preferably 20% to 50%, of a width of the region without the flow meshes.

As another alternative, a third peel ply can be disposed on the second film, one side of the third peel ply over the fiber preform extends beyond the region covered by the second film and overlaps with the second demolding cloth, the other side of the third peel ply outside said fiber preform covers onto the mold or the stopper, but not extends beyond the region covered by the second film.

An auxiliary suction port for pumping the air within the sealing system can be disposed above the third demolding cloth.

Besides, the resin-injection side of the fiber preform can completely be disposed above the first flow mesh and the air-pumping side of said fiber preform extends out of the first flow mesh with an extending width.

Preferably, the extending width is 0.5 to 5 times of the thickness of the fiber preform, more preferably 0.5 to 2 times, most preferably 1 to 2 times.

Besides, a distance between the second flow mesh on the air-pumping side of the fiber preform and an edge of the fiber preform is 0.5 to 10 times of the thickness of said fiber preform, more preferably 1 to 5 times, most preferably 1.5 to 3 times.

In another illustration, one end of a resin tube can be connected with the first and second injection ports via a first and second resin tube valves, and the other end of the resin tube is connected with a resin vessel to supply the resin. A vacuum tube can also be connected with the suction port and a vacuum pump via vacuum tube valves. Alternatively, a vacuum tube can also be connected with the auxiliary suction port and a vacuum pump via a vacuum tube valve.

The present invention uses the method of disposing flow meshes both below and above a fiber preform simultaneously to shorten the distance and the required time of the flowing of the resin within the fiber preform, and thus to realize vacuum infusion molding a fiber preform having a great thickness, which cannot be realized within the gel time of a resin using traditional techniques. Said resin can be polyurethane resin, epoxy resin or unsaturated resin.

The present invention transfers the injection port and injection tube, which is originally required to be placed above the fiber preform, to the side of the mold by separating the flow meshes above and below the fiber preform. It realizes the separate injection from the flow meshes above and below the fiber preform respectively, and at the same time solves the process and product quality problems brought by disposing the injection tube and injection port above said fiber preform.

In addition, the present invention, on the one hand, uses a semi-permeable membrane which is permeable to air but is non-permeable to resin to let air within the fiber preform discharged through the semi-permeable membrane continuously so as to avoid the production of dry glass fibers and white spots; on the other hand, it is also possible to further design passages that allow the air to discharge. The use of a semi-permeable membrane which is permeable to air but is non-permeable to resin and/or double passages and even multiple passages avoids the easy formation of quality defects like the dry glass fibers and/or white spots near the aforesaid air-discharge passages.

BRIEF DESCRIPTION OF THE DRAWINGS

To further explain the steps and the advantages of the method for manufacturing fiber-reinforced plastic products of the present invention, the following provides detailed illustrations of the above method in combination with the drawings and the detailed description, wherein.

REFERENCE SIGNS

Figure 1:
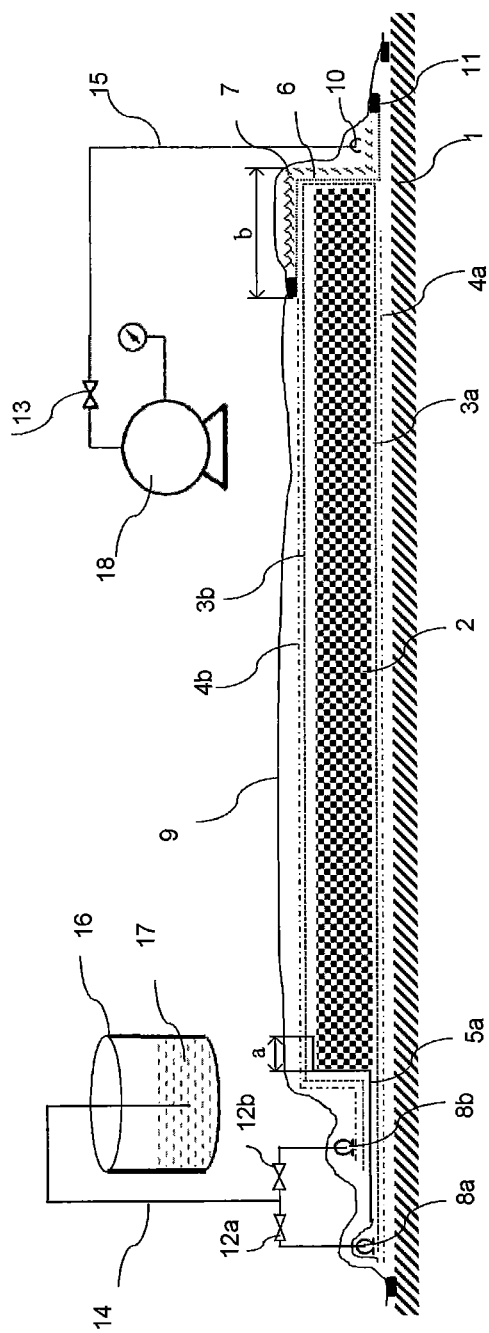
FIG. 1 is a schematic diagram of the First Example according to the method for manufacturing fiber-reinforced plastic products of the present invention.

1—mold
2—fiber preform
3a, 3b, 3d—demolding cloths
3c peel ply extension segment
4a, 4b—first flow mesh and second flow mesh
5a, 5b—first film and second film
6—semi-permeable membrane
7—breathable felt
8a, 8b—first injection port and second injection port
9—vacuum bag
10, 10', 10"—suction ports
10a—auxiliary suction port
11—sealant tape
12a, 12b—resin tube valves
13, 13a, 13b—vacuum tube valves
14—resin tube
15—vacuum tube
16—resin vessel
17—resin
18—vacuum pump
19—stopper

DETAILED DESCRIPTION

The following provides detailed description in combination with drawings of preferable examples according to the method for manufacturing fiber-reinforced plastic products of the present invention.

The First Example

Please refer to FIG. 1. Said figure shows the First Example according to the method for manufacturing fiber-reinforced plastic products of the present invention.

The method for manufacturing fiber-reinforced plastic products disclosed in the present invention is especially suitable for fiber preforms having relatively large thicknesses or that can hardly be impregnated by the resin, wherein, the so-called "fiber preforms having relatively large thicknesses" generally refers to the fiber preforms that can hardly have their entire thicknesses, which are determined by the property of the resin used therein, fully impregnated within the gel time of the resin. In the present invention, the resin can be selected from common resins such as polyurethane resin, epoxy resin, etc., as well as any uncommon resin that is suitable for impregnation of fiber preforms.

The following briefly introduces the steps of applying the method for manufacturing fiber-reinforced plastic products of the present invention using the above system.

(a) Firstly, a first or a lower flow mesh 4a (shown as a dashed line in FIG. 1) was disposed on a mold 1 which had subjected to a surface treatment. The first flow mesh 4a can have a width 10 to 50 cm larger, preferably 10 to 30 cm larger, than the width of the product so as to guarantee that an injection port 8a can be arranged on the first flow mesh 4a conveniently. A first or a lower peel ply 3a (shown as a dotted line in FIG. 1) was disposed on the first flow mesh 4a, which covered the first flow mesh 4a underneath completely. Multiple layers of fiber cloths were disposed in sequence on the first peel ply 3a and finally a fiber preform 2 was obtained. The resin-injection side (i.e. the left side of FIG. 1) of the fiber preform 2 was completely located above the first flow mesh 4a, and the air-pumping side (i.e. the right side of FIG. 1) of the fiber preform 2 could extend out of the first flow mesh 4a. The extending width may be 0.5 to 5 times, preferably 0.5 to 2 times, more preferably 1 to 2 times of the thickness of the fiber preform 2.

(b) A first or lower injection port 8a was disposed on the first flow mesh 4a on the resin-injection side of the fiber preform 2. A first film 5a (shown as a full line in FIG. 1) was used to cover the first injection port 8a and partly cover over the resin-injection side of the fiber preform 2. The first covered width a of the first film 5a for covering the fiber preform 2 may be 0.5 to 10 times, preferably 0.5 to 3 times, more preferably 0.5 to 1 times of the thickness of the fiber preform 2.

(c) A second or upper peel ply 3b (also shown as a dotted line in FIG. 1) was disposed over the first film 5a and the fiber preform 2, and a second or upper flow mesh 4b (also shown as a dashed line in FIG. 1) was further disposed over the second peel ply 3b. The second flow mesh 4b, with respect to the air-pumping side of the fiber preform 2, had a distance b from the edge of the fiber preform 2 that may be 0.5 to 10 times, preferably 1 to 5 times, more preferably 1.5 to 3 times of the thickness of the fiber preform 2.

(d) A second injection port 8b was disposed on the second flow mesh 4b on the resin-injection side of the fiber preform 2, and a semi-permeable membrane 6 (shown as a thin dotted line in FIG. 1), which is permeable to air but is non-permeable to resin, was disposed within an area without the second flow mesh 4b on the air-pumping side of the fiber preform 2. Advantageously, a breathable felt 7 on which a suction port 10 was arranged may be further disposed on the semi-permeable membrane 6. Of course, other breathable materials may be used in place of the breathable felt 7, or, the suction port 10 can be arranged directly on the semi-permeable membrane 6 by omitting the breathable felt 7. These changes can be easily conceived of by those ordinarily skilled in the art, and thus would all fall within the protection scope of the present application.

(e) All of the above parts were sealed in a vacuum bag membrane 9 with sealing materials such as the vacuum bag membrane 9 and the sealant tape 11, etc. so as to form a sealing system. One end of a resin tube 14 was connected to a first and a second injection ports, 8a and 8b, through a first and a second resin tube valves, 12a and 12b. A vacuum tube 15 was connected to the suction port 10 and a vacuum pump 18 through a vacuum tube valve 13.

(f) The first and the second resin tube valves, 12a and 12b, are closed, and the vacuum tube valve 13 was opened, then the vacuum pump 18 is started. At the moment, air in the vacuum bag membrane 9 would permeate the semi-permeable membrane 6 and the breathable felt 7, and be discharged by the vacuum pump 18 via the suction port 10 along the vacuum tube 15. Finally, a vacuum system is formed in the vacuum bag membrane 9, wherein the vacuum degree may be above −0.05 MPa, preferably above −0.08 MPa, more preferably above −0.09 MPa.

(g) During the infusion of a resin 17, the first and the second resin tube valves, 12a and 12b, were closed, and the other end of the resin tube 14 was inserted into a resin tank 16 and was fully impregnated in the resin 17. Firstly, the first resin tube valve 12a was opened. At the moment, the resin would be injected into the above vacuum system from the first injection port 8a along the resin tube 14 via the first resin tube valve 12a. The resin diffused rapidly along the first flow mesh 4a and penetrated the first peel ply 3a, thereby impregnating the fiber preform 2 from bottom to top. Since the resin-injection side of the fiber preform 2 can obtain the resin earlier and more rapidly, the resin-injection side of the fiber preform 2 can be impregnated more rapidly. The second resin tube valve 12b was opened when the resin over the fiber preform 2 flowed beyond the area covered by the first film 5a so as to enable the resin to be injected to the above vacuum system from the second injection port 8b via the second resin tube valve 12b. The resin diffused rapidly along the second flow mesh 4b and penetrated the second peel ply 3b, thereby impregnating the fiber preform 2 from top to bottom. During the continuous operation of the vacuum pump 18, air in the fiber preform 2 was discharged continuously, whereas the resin flowed continuously and impregnated the entire fiber preform 2. Because of the presence of the semi-permeable membrane 6, it can be guaranteed that the air would be discharged continuously rather than being blocked by the resin and finally all the fibers can be totally impregnated without the production of the defects such as white spots and/or dry glass fibers and the like.

The Second Example

Figure 2:
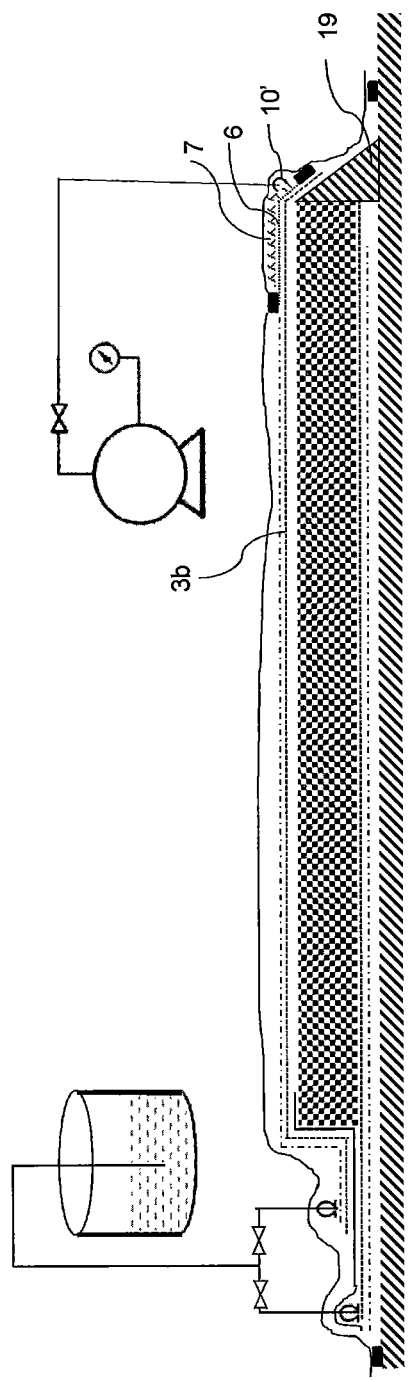
FIG. 2 is a schematic diagram of the Second Example according to the method for manufacturing fiber-reinforced plastic products of the present invention.

Please refer to FIG. 2. Said figure shows the Second Example according to the method for manufacturing fiber-reinforced plastic products of the present invention.

As shown in FIG. 2, a stopper 19 was arranged on the air-pumping side of the fiber preform 2 or a mold 1 to replace the breathable felt 7 in the First Example. In FIG. 2, the stopper is in a triangle shape, but in the actual use, stoppers with other suitable shapes can also be selected.

The arrangements of the parts in the Second Example are identical to those of the First Example, except that the second peel ply 3b, the semi-permeable membrane 6 and the breathable felt 7 were disposed on the stopper 19, and a suction port 10' was also arranged on the stopper 19.

Since in the Second Example, the stopper 19 was used in place of the second peel ply 3b, the semi-permeable membrane 6 and the breathable felt 7 that were disposed at the edge of the fiber preform 2, the required lengths of the second peel ply 3b, the semi-permeable membrane 6 and the breathable felt 7 would be shortened greatly.

Certainly, for those ordinarily skilled in the art, it is easily to conceive of the variations in which the second peel ply 3b, the semi-permeable membrane 6 and the breathable felt 7 were disposed on the mold 1 outside the stopper 19, and the suction port 10' was also arranged outside the stopper 19. All of them would fall within the protection scope of the present application.

The Third Example

Figure 3:
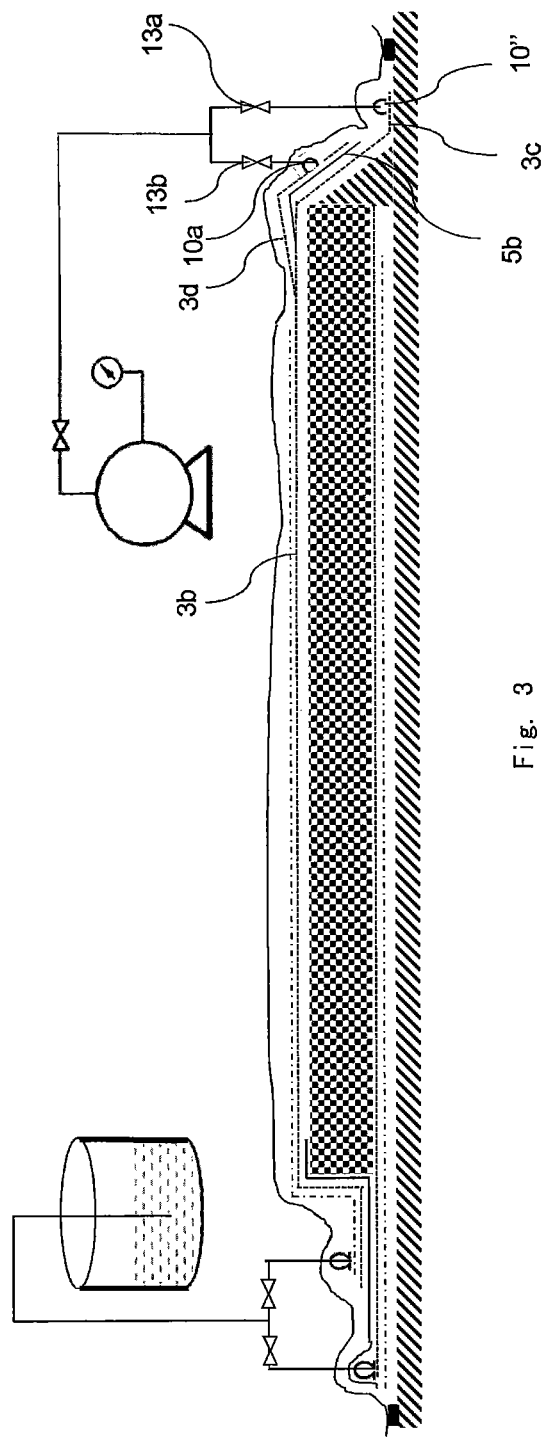
FIG. 3 is a schematic diagram of the Third Example according to the method for manufacturing fiber-reinforced plastic products of the present invention.
Figure 4:
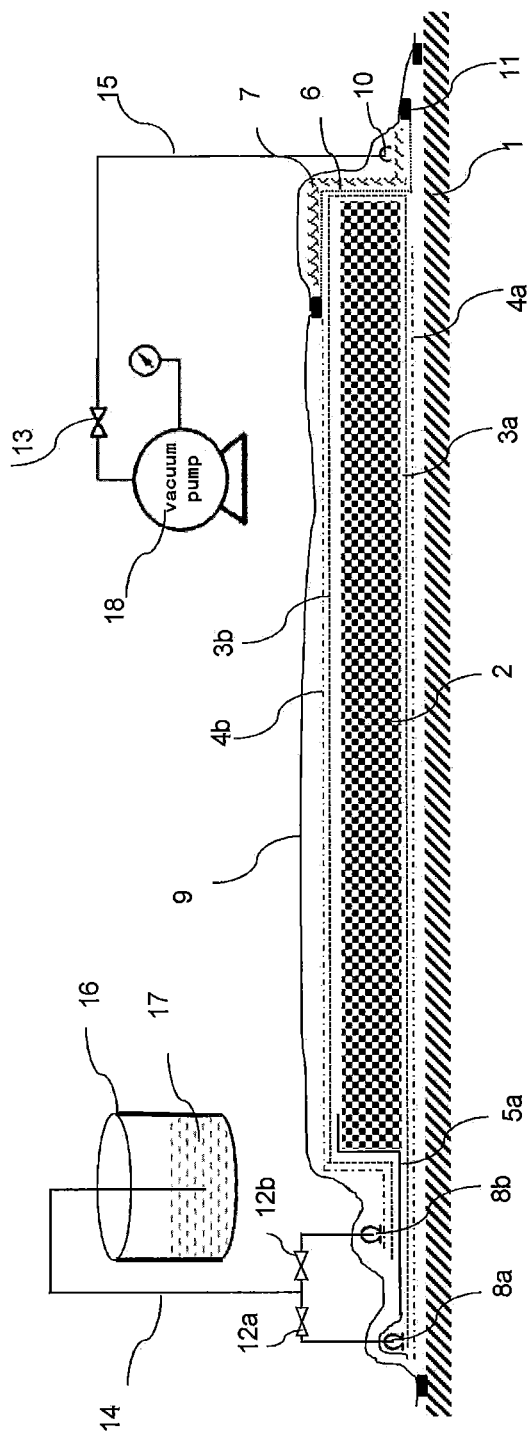
FIG. 4 is a schematic diagram of the First Example according to the method for manufacturing fiber-reinforced plastic products of the present invention.

Please refer to FIG. 3. Said figure shows the Third Example according to the method for manufacturing fiber-reinforced plastic products of the present invention.

On the basis of step (c) of the Second Example, the second peel ply 3b, when disposed, may further extend to above the stopper 19 and the mold 1 so as to form a peel ply extension segment 3c as shown in FIG. 3 (shown as a dashed line in FIG. 3).

(d1) A suction port 10" was arranged over the peel ply extension segment 3c. A second film 5b was used to partly or completely cover the peel ply extension segment 3c and the suction port 10", and to partly cover the fiber preform 2. The covered width of the fiber preform may be 10% to 70%, preferably 20% to 50%, of the width of the area without a flow mesh.

(d2) A third peel ply 3d (shown as a dashed line in FIG. 3) was disposed on the second film 5b. As shown in FIG. 3, one side (i.e. the left side of FIG. 3) of the third peel ply 3d over the fiber preform 2 was beyond the area covered by the second film 5b and overlapped with the second peel ply 3b, whereas the other side (i.e. the right side of FIG. 3) of the third peel ply 3d outside the fiber preform 2 covered the mold 1 or the stopper 19, but was not beyond the area covered by the second film 5b. An auxiliary suction port 10a was arranged over the third peel ply 3d accordingly, and the vacuum tube 15 was connected to the suction port 10", the auxiliary suction port 10a and the vacuum pump 18 through a first vacuum tube valve 13a and a second vacuum tube valve 13b.

(f) The first and the second resin tube valves, 12a and 12b, were closed and the first and the second vacuum tube valves, 13a and 13b, were opened, and then the vacuum pump 18 was started. At the moment, air in the vacuum bag membrane 9 would permeate the peel ply extension segment 3c and the third peel ply 3d, and be discharged by the vacuum pump 18 via the suction port 10" and the auxiliary suction port 10a along the vacuum tube 15. Finally, a vacuum system was formed within the vacuum bag membrane 9, wherein the vacuum degree may be above −0.05 MPa, preferably above −0.08 MPa, more preferably above −0.09 MPa.

(g') During the infusion of the resin, the first and the second resin tube valves, 12a and 12b, were closed, and the resin tube 14 was inserted into the resin tank 16 and was fully immerged in the resin 17. Firstly, the first resin tube valve 12a was opened. At the moment, the resin would be injected to the above vacuum system from the first injection port 8a along the resin tube 14 via the first resin tube valve 12a. The resin diffused rapidly along the first flow mesh 4a and penetrated the first peel ply 3a, thereby impregnating the fiber preform 2 from bottom to top. Since the resin-injection side of the fiber preform 2 can obtain the resin earlier and more rapidly, the resin-injection side of the fiber preform 2 can be impregnated more rapidly. The second resin tube valve 12b was opened when the resin over the fiber preform 2 flowed beyond the area covered by the first film 5a so as to enable the resin to be injected into the above vacuum system from the second injection port 8b via the second resin tube valve 12b. The resin diffused rapidly along the second flow mesh 4b and penetrated the second peel ply 3b, thereby impregnating the fiber preform 2 from top to bottom. During the continuous operation of the vacuum pump 18, air within the fiber preform 2 was discharged continuously, whereas the resin flowed continuously and impregnated the entire fiber preform 2. During the infusion, the edges and the angles of the mold 1 would generally become the rapidly flowing passages of the resin. Therefore, the resin underneath the fiber preform 2 would flow rapidly along the edges and the angles of the fiber preform 2 and reach the peel ply extension segment 3c, thus leading to the blockage of the peel ply extension segment 3c and the suction port 10" as discharge passages. At the moment, because of the presence of the other discharge passage, i.e. the third peel ply 3d and the auxiliary suction port 10a, air within the fiber preform 2 can still be discharged through the auxiliary suction port 10a, and finally all the fibers can be completely impregnated without the production of the defects such as white spots and/or dry glass fibers and the like.

Although the above provides the explanation of the methods for manufacturing fiber-reinforced plastic products of the present invention with three preferable examples, those ordinarily skilled in the art should appreciate that the above preferable examples are merely explanations and cannot be regarded as the limitations to the present invention. For example, the demolding cloths used in the above examples may be replaced with porous release film or other separation materials; the injection ports may be replaced with injection tubes or other injecting devices; and the resin tank may be replaced with resin barrels or other vessels that can contain resin, etc. Therefore, the present invention can be changed within the substantive spirit scope of the claims, and all of these variations would fall within the scope claimed in the claims of the present invention.

What is claimed is:

1. A method for manufacturing fiber-reinforced plastic products, comprising:
   preparing a fiber preform on a mold and disposing a first peel ply and a first flow mesh between said mold and said fiber preform;
   disposing a second peel ply and a second flow mesh on said fiber preform;
   disposing a first injection port and a second injection port for supplying a resin on said first flow mesh and said second flow mesh, respectively;
   sealing the fiber preform to form a sealing system, and pumping the air within the sealing system via a suction port until said sealing system becomes a vacuum system;
   supplying said resin to said first flow mesh via said first injection port so that said resin penetrates through said first peel ply and impregnates the fiber preform from a first side of said preform;
   supplying said resin to said second flow mesh via said second injection port so that said resin penetrates through said second peel ply and impregnates said fiber preform from a second side of said preform, opposing said first side; and
   attaining a resin-impregnated fiber preform and finally attaining said fiber-reinforced plastic products,
   wherein
   a first film is disposed on a resin-injection side of said fiber preform to cover said first injection port, said first peel ply, said first flow mesh, and only a first portion of said fiber preform, while leaving said second injection port and a second portion of said fiber preform uncovered, so that said first injection port and said second injection port are separated by said first film, and wherein after the resin is supplied to said first flow mesh via said first injection port and the fiber preform underneath said first film is impregnated, the resin is supplied to said second flow mesh via said second injection port when the resin over said fiber preform flows beyond the area covered by said first film.

2. The method according to claim 1, wherein a first covering width of said fiber preform covered with said first film is 0.5 to 10 times of a thickness of said fiber preform.

3. The method according to claim 1, wherein a first covering width of said fiber preform covered with said first film is 0.5 to 2 times of a thickness of said fiber preform.

4. The method according to claim 1, wherein a first covering width of said fiber preform covered with said first film is 1 to 2 times of a thickness of said fiber preform.

5. The method according to claim 1, wherein a semi-permeable membrane, which is permeable to air but is non-permeable to said resin, is disposed within a region without said second flow mesh on an air-pumping side of said fiber preform, and wherein said suction port is disposed above said semi-permeable membrane.

6. The method according to claim 5, wherein a breathable material is disposed between said semi-permeable membrane and said suction port.

7. The method according to claim 5, wherein a stopper is disposed on said air-pumping side of said fiber preform so that said second peel ply and said semi-permeable membrane disposed at an edge of said fiber preform extend onto said stopper.

8. The method according to claim 5, wherein a stopper is disposed on said air-pumping/vacuum pumping side of said fiber preform so that said second peel ply disposed at an edge of said fiber preform extends onto said stopper and said mold to constitute a peel ply extension segment, and said suction port is disposed above said peel ply extension segment, and wherein a second film at least partly covers said peel ply extension segment and said suction port and partly covers said fiber preform.

9. The method according to claim 8, wherein a width of said fiber preform covered with said second film is 10% to 70% of a width of the region without said flow meshes.

10. The method according to claim 8, wherein a width of said fiber preform covered with said second film is 20% to 50% of a width of the region without said flow meshes.

11. The method according to claim 8, wherein a third peel ply is disposed on said second film, one side of said third peel ply over said fiber preform extends beyond the region covered by said second film and overlaps with said second peel ply, and the other side of said third peel ply outside said fiber preform covers onto said mold or said stopper but does not extend beyond the region covered by said second film.

12. The method according to claim 11, wherein an auxiliary suction port for pumping the air within said sealing system is disposed above said third peel ply.

13. The method according to claim 1, wherein said resin-injection side of said fiber preform is completely disposed above said first flow mesh and said air-pumping side of said fiber preform extends beyond said first flow mesh with an extending width.

14. The method according to claim 13, wherein said extending width is 0.5 to 5 times of a thickness of said fiber preform.

15. The method according to claim 13, wherein said extending width is 0.5 to 2 times of a thickness of said fiber preform.

16. The method according to claim 13, wherein said extending width is 1 to 2 times of a thickness of said fiber preform.

17. The method according to claim 1, wherein a distance between said second flow mesh on said air-pumping side of said fiber preform and an edge of said fiber preform is 0.5 to 10 times of a thickness of said fiber preform.

18. The method according to claim 1, wherein a distance between said second flow mesh on said air-pumping side of said fiber preform and an edge of said fiber preform is 1 to 5 times of a thickness of said fiber preform.

19. The method according to claim 1, wherein a distance between said second flow mesh on said air-pumping side of said fiber preform and an edge of said fiber preform is 1.5 to 3 times of a thickness of said fiber preform.

20. The method according to claim 1, wherein one end of a resin tube is connected with said first and second injection ports via a first and second resin tube valves, and the other end of said resin tube is connected with a resin vessel to supply said resin.

21. The method according to claim 1, wherein a vacuum tube is connected with said suction port and a vacuum pump via vacuum tube valves.

22. The method according to claim 12, wherein a vacuum tube is connected with said auxiliary suction port and a vacuum pump via a vacuum tube valve.

23. The method according to claim 1, wherein said resin is polyurethane resin, epoxy resin, or unsaturated resin.

* * * * *